United States Patent [19]
Eskenas

[11] 3,947,693
[45] Mar. 30, 1976

[54] PUSH BUTTON ELECTRICAL COMBINATION IGNITION LOCK

[76] Inventor: Joel L. Eskenas, 44 Noel Ave., Brooklyn, N.Y. 11229

[22] Filed: June 11, 1974

[21] Appl. No.: 478,214

[52] U.S. Cl............................. 307/10 AT; 317/134
[51] Int. Cl.²........................................ B62D 45/00
[58] Field of Search.................. 307/10 AT; 200/43; 317/134; 340/64

[56] References Cited
UNITED STATES PATENTS

| | | | |
|---|---|---|---|
| 2,820,149 | 1/1958 | Roth | 307/10 AT |
| 3,271,629 | 9/1966 | Holy | 317/134 |
| 3,756,341 | 9/1973 | Tonkowich et al. | 307/10 AT |

*Primary Examiner*—Herman J. Hohauser
*Attorney, Agent, or Firm*—Howard I. Podell

[57] ABSTRACT

An electrical push button ignition combination lock wired into the electric circuit of the motor of a vehicle or power boat. The ignition combination lock comprises a box housing plurality of mounted push buttons each joined to an individual slidable rod, each of which actuates an electrical switch, when the button is pushed. Pushing the proper combination of buttons energizes a relay to complete the ignition circuit, while the pressing of any of the other buttons grounds the circuit and disables the device.

2 Claims, 4 Drawing Figures

PUSH BUTTON ELECTRICAL COMBINATION IGNITION LOCK

SUMMARY OF THE INVENTION

My invention relates to an electrical push button ignition combination lock for a vehicle or boat motor which is connected to the ignition circuit of the motor.

The ignition combination lock comprises a box housing plurality of mounted push buttons each joined to an individual slidable rod, each of which actuates an electrical switch, when the button is pushed. Pushing the proper combination of buttons energizes a relay to complete the ignition circuit, while the pressing of any of the other buttons grounds the circuit and disables the device.

BRIEF DESCRIPTION OF THE DRAWING

The objects and features of the invention may be understood with reference to the following detailed description of an illustrative embodiment of the invention, taken together with the accompanying drawings in which.

DESCRIPTION OF THE PREFERRED EMBODIMENT

Figure 1:
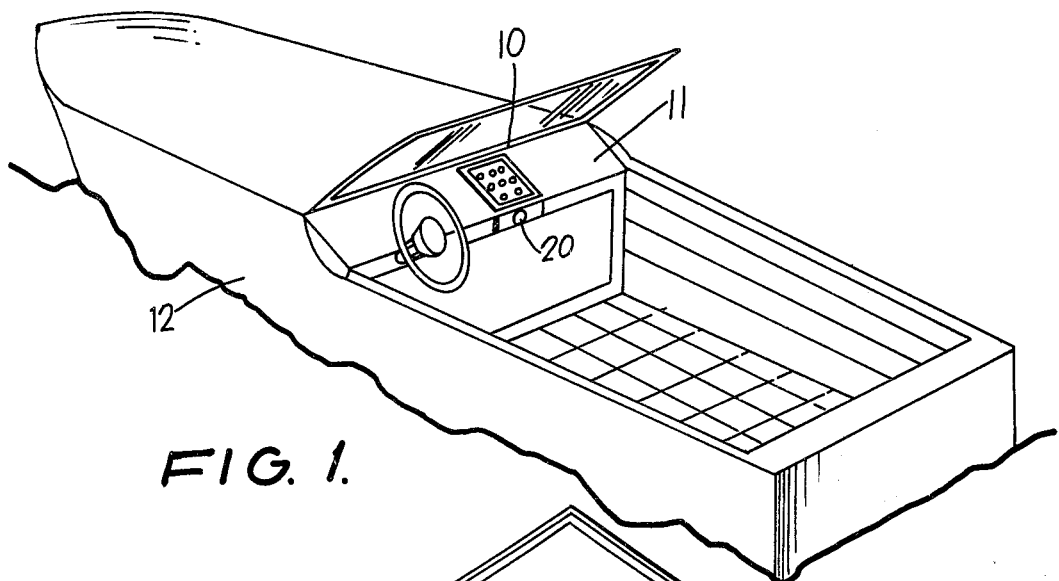
FIG. 1 illustrates a perspective view of the invention in use.

Turning now descriptively to the drawings, in which similar reference characters denote similar elements throughout the several views, FIG. 1 illustrates a power boat 12 equipped with the electrical lock switch box 10 mounted on the dashboard 11 for controlling the motor ignition circuit. The box 10 is fitted with a key-operated lock 20 that permits opening of the box 10 for resetting of the proper combination of the switch box 10.

Figure 2:
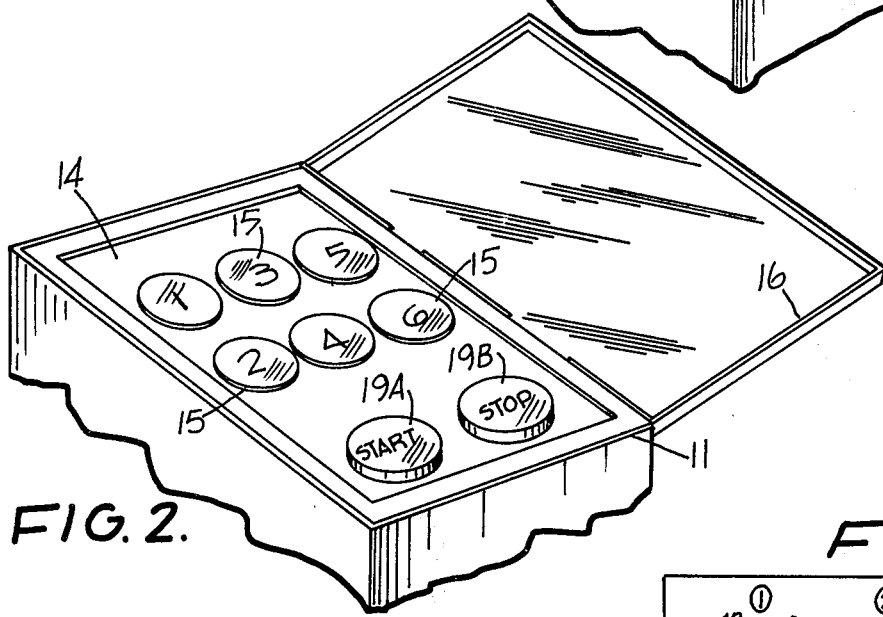
FIG. 2 illustrates a top perspective view of the switch box.
Figure 3:
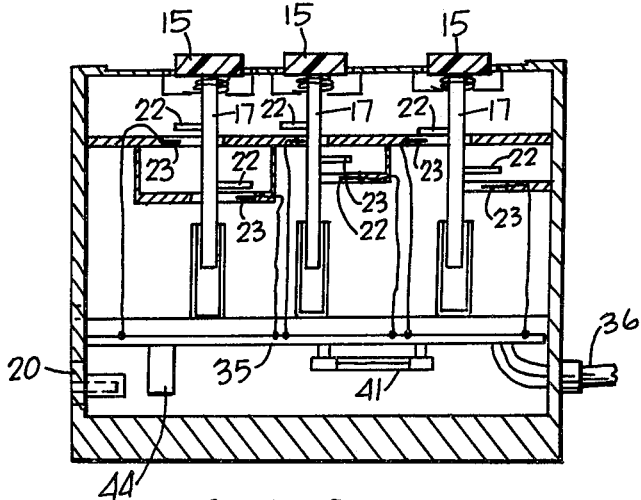
FIG. 3 illustrates a sectional view of the switch box.
Figure 4:
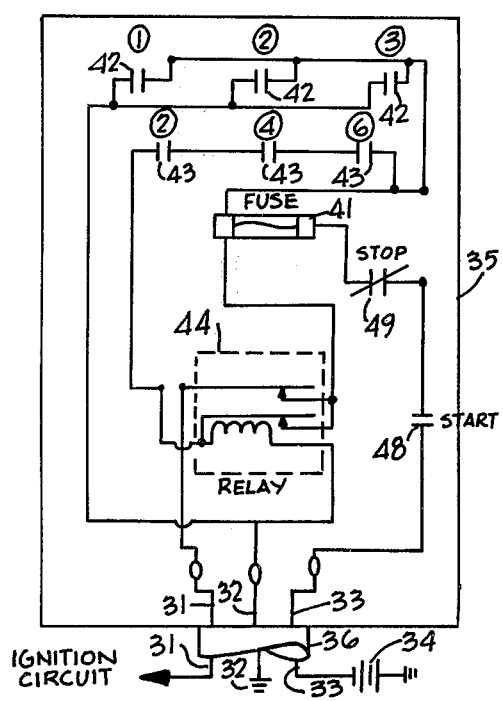
FIG. 4 illustrates a schematic diagram of the electrical circuit of the switch box.

As shown in FIGS. 2–4, the box 10 may have a hinged cover 16 which encloses a panel 14 on which numbered and marked push buttons 15 and 19 are mounted.

Each button 15 is fastened to a spring-mounted switch metal rod 17, with each rod 17 individually fastened to the common electrical contacts 22 of a normally open single pole, single throw electrical switch 42 or 43.

When pushed by button 15, the rod contacts make the switch contacts 23 of the switch 42 or 43 to complete the circuit of a switch 42 or 43. Button 19A of the start switch operates a similar Normally Open switch 48 and button 19B of the Stop switch operates a Normally Closed switch 49.

The wires from switch contacts 22 lead to a panel 35 on which a fuse 41 and a relay 44 are mounted and to which a ground wire 32, a battery wire from external battery 34, and a wire 31 from the ignition coil (not shown) is led into the housing through an external armored cable housing 36. Panel 35 may be removed from box 10 when lock 20 is opened, to permit wiring of the switches 42 and 43 to set the desired individual combination.

As shown in FIG. 4, the particular combination of wiring of the preferred embodiment has joined switches 42 in parallel and joined switches 43 in series.

The circuit of switches 42 joins the ground circuit 32 to the fuse 41 through the N.C. stop switch 49 and the N.O. start switch 48, so that if any one of push buttons marked "1", "3", or "5" is pressed when the start push button 19A is pressed, or when Relay 44 is energized, the fuse 41 will blow, disabling the circuit until the box 10 is unlocked by lock 20 and the fuse 41 replaced.

To connect the ignition circuit 31 of the motor to the battery 34 in proper fashion, all switches 43 must be connected by manually pressing push buttons 15 marked "2", "4", and "6" and pressing the push button 19A marked "Start". This energizes the coil of relay 44 which is then locked into the circuit and connects the ignition circuit 31 to the battery circuit 33 through N.C. "Stop" switch 49. Pressing of push button 19B marked "Stop", opens the relay circuit and de-energizes the ignition circuit.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim is new and desire to secure by Letters Patent of the United States is:

1. An electrical switching device connected to the ignition circuit of the motor of a vehicle which permits connection of power to the ignition circuit when the proper combination of switches mounted on the device are simultaneously manually operated and which disables the electrical circuit when one or more disabling switches are manually operated comprising
    a switch box on which a plurality of push buttons are mounted for the individual operation of momentary normally open switches, with a first group of said switches wired together in series to a circuit for connecting a self-latching relay to a power supply circuit, and with
    one or more of a second group of said switches wired in parallel together, and to a circuit joining the opposite poles of the power supply circuit, together with
    an electrical fuse connected in series with the power supply line leading to all the switches of the second group and to one of the switches of the first group, such that operation of any of the parallel wired switches will cause the fuse to blow,
    said relay having a normally open contactor that joins the ignition circuit of the motor through said fuse to the power supply when the relay is in the energized state.

2. The combination as recited in claim 1 in which the fuse is located in a box, the cover of which is fitted with a removable key operated lock.

* * * * *